E. C. WELD.
Improved Ice Machine.
No. 118,411.  Patented Aug. 22, 1871.
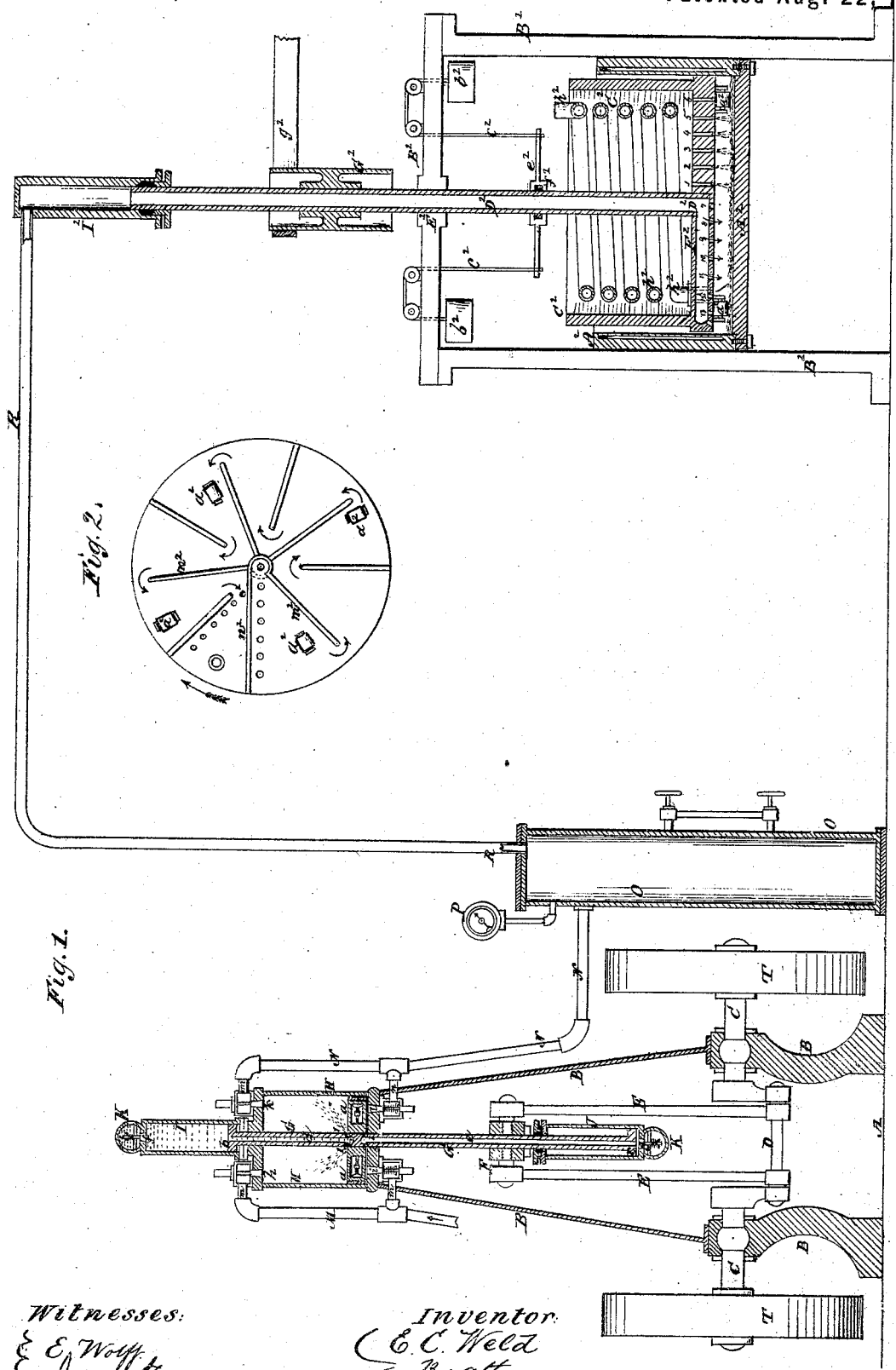

UNITED STATES PATENT OFFICE.

ELWYN C. WELD, OF NEW YORK, N. Y.

IMPROVEMENT IN APPARATUS FOR MAKING ICE.

Specification forming part of Letters Patent No. 118,411, dated August 22, 1871.

*To all whom it may concern:*

Be it known that I, ELWYN C. WELD, of New York city, of New York county, in the State of New York, have invented certain new and useful Improvements in Machinery or Apparatus for Making Ice; and I do hereby declare that the following is a full and exact description thereof, reference being had to the accompanying drawing making part of this application.

Previous to my invention a great variety of machines have been devised for the purpose of making ice, all of which, however, have been adapted to operate upon one of two principles, viz., the process of freezing the water by the indirect action upon it of some chemical agent; or the process of freezing the water by direct contact with it of air which has been previously compressed and deprived of its latent heat, and which, in the act of expansion in contact with the water, reduces the temperature of the latter below the freezing-point. For many years various processes and machines have been known and tried by means of which ice could be produced artificially; but for want of the elements of practical and commercial utility in the machines and processes employed great difficulties have been encountered in the successful introduction into use of artificial-ice machines.

My invention does not relate to any new process or principle of operation, but to certain improvements in the machinery employed in that kind of ice-machines and that process in which atmospheric air is compressed by an engine, and, after having been deprived of its latent heat and that generated in the operation of compression, is brought into direct contact with the water in a refrigerator, where the water is subjected in thin stratums to the freezing action of said air as it expands, or where the water is frozen in successive layers. My invention has for its main object to provide a machine or apparatus adapted to carry on this process of freezing the water in successive layers or building up the block of of ice by direct contact with it of the refrigerant, which shall be simpler in its construction, more efficient and economical in its operation, and in every manner more desirable and useful than machines heretofore constructed for the same purpose; and to these ends my invention consists, first, in a novel construction of the air-compressing mechanism, by means of which the air under compression in the cylinder is cooled by jets or sprays of cold water injected through the piston by a pump or pumps worked by the piston-rod of the air-pumps, as will be hereinafter more fully described; and second, in a novel construction of the refrigerator, in which the ice is built up by the freezing of successive layers of water ejected from a tank or reservoir, the bottom of which moves over and away from the ice-surface, which contains a coil for cooling the exhaust air, and which is so constructed as to induce to a very efficient and economic use of the refrigerant, as will be hereinafter more fully explained.

To enable those skilled in the art to make and use my improved ice-machine, I will proceed to more fully describe it, referring by letters to the accompanying drawing, in which—

Figure 1 is a vertical central section through a machine made in accordance with my invention; and Fig. 2 is a detail view, showing the bottom of the refrigerator-tank or moving supply-reservoir.

As is clearly illustrated, the machine, like others of its class, embraces a mechanism for compressing and cooling the air or refrigerant, and a refrigerator into which the refrigerant is allowed to escape and come in contact with the water to be frozen, and as the operations and functions of these two mechanisms are different, though both are essential to carry on the process of ice making, I will describe first the construction and operation of the mechanism for preparing and supplying the refrigerant, and then explain the construction and operation of the refrigerator proper.

In the accompanying drawing, A illustrates the bed-plate on which the air-engine is supported; B, the main frame of the machine, in the lower portion of which is mounted in suitable bearings the main driving-crank shaft C, from the crank D of which extend pitmen E, which are connected at their upper ends to a cross-head, F, on the piston G. On the upper end of the main frame B is located the air-cylinder H, and immediately over it a water-pump cylinder, I, while at J is another water-pump cylinder—a duplicate of I. Each of said cylinders I and J receives a supply of water from a branch pipe, K, which passes off to a suitable main supply-pipe. On the piston-rod G is secured the piston $a$ of the air-cylinder H, and at the ends of said piston-rod are formed pistons $b$ $c$, which work respectively in the cylinders I J, while through the center of said piston-rod extend longitudinally from each extremity to about where the piston $a$ is located, water-passages $d$ $e$, which communicate at 1 and 2 with the interior of the air-cylinder H, as clearly illustrated. The pump-cylinders I and J are each provided with a valve at $f$ and $g$, as shown, after the usual manner of making a single-acting pump, and the air-cylinder H is provided with four valves—two in each head—two of which four, $h$ and $i$, open inward, and two, $k$ and $l$, open outward. From the air-chest at each of these four valves extend air-pipes, two of which, $m$ $m$, connect with the air-supply pipe or induction-pipe M, and the other two $n$ $n$ of which connect with the pipe N, which passes off to the receiver $o$. This receiver is made in the usual manner, is provided with a pressure-gauge, P, and from it passes the eduction-tube R, through which the compressed air passes to the refrigerator. In the drawing I have indicated the water-spaces and passages in broken lines, while simple arrows indicate the directions in which and the passages through which the air is received, compressed, and discharged into the receiver $o$.

The operation of this much of my improved apparatus may be thus briefly explained. The machine being put in motion by motive power applied to the driving-pulleys T, and a supply of air and of water being afforded to the air and to the water-cylinders, the piston-rod G receives a reciprocatory motion, through the medium of the pitmen E, cross-head F, and crank D, from the main shaft C, and carries with it the piston $a$ of the air-cylinder and the pistons $b$ $c$ of the water-cylinders, and at each stroke of the piston-rod G the contents of cylinder H is compressed and forced out, and the contents of one or the other of cylinders I J is forced into the cylinder H.

It will be understood that the air-pump is double-acting, while each of the water-pumps is single-acting, so that at each up-stroke of the piston $a$ of the air-pump water is forced into the air-cylinder from pump I, as illustrated, while at each down-stroke the water is supplied from pump J, the air being supplied to cylinder H at each stroke of its piston through the valves $h$ and $i$ alternately and forced out from said cylinder at each stroke alternately through valves $k$ and $l$.

It will be seen that by the combination of the pumps I and J with the piston of the air-pump, in the manner shown and described, a very simple and compact machine is produced, and one which is easily driven and will work economically and successfully; and it will be understood that numerous variations in the details of construction may be made without departing from the spirit of my invention. For instance, in lieu of the two single-acting water-pumps, one double-acting pump may be employed, and the passages and ports in the piston-rod may be so arranged as to still induce to the discharge of the water alternately at the points 1 and 2—first on one and then on the other side of piston $a$.

I will now explain the construction and operation of the refrigerator.

$A^2$ is a simple cylindrical ice-chamber, which is supported by a suitable frame, $B^2$, and which is so made that its bottom may be taken out for the purpose of removing the block of ice. The cylindrical sides of the ice-chamber $A^2$ may be formed or provided with a steam-space or steam-jacket for the purpose of slightly thawing the ice to expedite its extraction from said chamber. Within the chamber or cylindrical case $A^2$ is arranged, so as to fit nicely, but be free to move axially, and also to rotate, another cylindrical chamber, $C^2$. This chamber $C^2$ has, extending upward from the center of its bottom, a hollow vertical shaft, $D^2$, which is free to turn and to slide longitudinally in a suitable bearing at $E^2$ in the frame $B^2$, and through which the refrigerant is supplied, as will be presently explained. The chamber $C^2$ contains the supply of water, as illustrated by the broken lines in the drawing, and is provided with caster-wheels $a^2$, which rest very lightly on the internal surface of the bottom of chamber $A^2$, said chamber $C^2$ being counterbalanced by weights $b^2$, the cords $c^2$ of which pass over suitable pulleys in the frame of the machine and are attached to a lifter-bar or frame, $e^2$, which is arranged about a collar or annular feather, $f^2$, of the hollow shaft $D^2$. In the bottom of the water-chamber $C^2$ is a series of holes, 1 2 3 4 5 6, arranged in the line of a radius of its circular bottom, through which water is supplied to flood the bottom of the ice-chamber $A^2$ and another series of holes, 7 8 9 10 11 12 13, communicating with the air-passage $F^2$, through which the cold air is supplied, all as will be hereinafter more fully explained. $G^2$ is a drum, by means of which a rotary motion is imparted to the shaft $D^2$ and the water-chamber $C^2$, by a belt, $g^2$, extending off to a suitable driving-pulley. $h^2$ is a coil formed of the exhaust-pipe, through which the exhaust air from the ice-chamber $A^2$ passes. $I^2$ is a coupling-box or chamber, with the upper end of which the supply-tube R, which comes from the receiver $o$, connects, and into the lower portion of which fits, so as to be capable of both a rotary and a sliding motion, the upper end of the hollow shaft $D^2$. On the lower surface of the bottom of case $C^2$ is arranged radially a series of vanes or thin partitions, $m^2$, in the peculiar manner shown at Fig. 2. These vanes extend down about as far as the caster $a^2$, and are designed to force the cold air which escapes from the holes 7, 8, 9, &c., to pass in a circuitous route over the surface of the water to be frozen. $n^2$ is a partition which is arranged almost radially, as shown, and which prevents the air from passing to the exit-tube or orifice (see Fig. 2) until it shall have traveled around and in the course and direction indicated by the arrows. The direction of rotation of the water-chamber $C^2$ is indicated by the arrow at Fig. 2, and is opposite to the general direction of travel of the air-current as it passes from the induction-holes 7, 8, &c., to the eduction-tube $h^2$.

The operation of the refrigerating mechanism or apparatus is as follows: The parts being adjusted about as seen in the drawing, and a comparatively slow rotary motion being imparted to the hollow shaft $D^2$ and the water-chamber $C^2$ by the means shown, the supply of air from the receiver $o$ is permitted to travel through the tube R, thence through the hollow shaft $D^2$, and escape in jets at the holes 7, 8, 9, &c., and fill the space between the bottom of chamber $C^2$ and the upper surface of the bottom of chamber $A^2$, where, expanding to its natural volume or normal degree of rarity, it absorbs the heat from any water which may be in said space and induces to the freezing of the water upon principles well known. At the same time that the air escapes, as just explained, a continuous supply of water passes in jets or in a sprayed condition from the holes 1, 2, 3, &c., and wets the top surface of the bottom of chamber $A^2$, and this wetted surface is frozen over by the continuously-escaping air as it expands in direct contact with it. The escape of the spray of water to wet the bottom of the ice-chamber occurs, it will be seen, always just in advance of the escaping current of air during the rotation or travel of the air and water-supplying reservoir or chamber $C^2$, so that the water always receives the first effect of the expanding air when the latter is most dense, and, consequently, in the most efficient condition as a refrigerant, and as the escaping air is forced to travel over the entire wetted surface in a circuitous route, as described, before it can escape at $h^2$, (see Fig. 2,) it follows that the largest practicable amount of heat is absorbed by a given volume of the refrigerant before it escapes from the refrigerating or ice-forming chamber, and that, consequently, a very economical result is attained. Since it is a maxim that the production of a given volume or quantity of the refrigerant (the compressed air) involves a given expense, it is evident that if in the use in the refrigerator of a given volume of the refrigerant every particle of the refrigerant can be made to absorb its equivalent of that, or be made to perform its maximum amount of refrigerating action on the water, the most economic results possible will be attained. It will be seen that by my improved refrigerator this desirable object is gained to a great extent, since the water is flooded or sprayed onto the bottom of the ice-chamber in a thin coating or layer, and all the particles of the refrigerant are brought into contact with all the particles of the water-surface in such a manner that the temperature of the water and air will be respectively reduced and raised to the greatest practical extent. As the supplies of water and air continue, and the rotation of the chamber $C^2$ is kept up, the formation of ice will continue by the successive wetting and freezing until a solid cylinder of ice is formed or built up in the chamber $A^2$, the caster-wheels or anti-friction rolls traveling always on the top of the ice. These caster-wheels or supporting-rolls should be so placed as that they will not "track" or travel in the same path, but in different circles, so as to avoid any tendency to the formation of a circular groove in the ice where they take a bearing, and any consequent clogging and unnecessary friction, and the space between the lower surface of the bottom of $C^2$ and the top surface of the bottom of $A^2$ should be as little as consistent with a proper size of the caster-wheels, for the thinner the stratum of cold air is which fills this space the more effectually can all its particles be brought into contact with the water to be frozen before said air escapes from this space in which the refrigeration is carried on. The chamber $C^2$, as it rotates and rises with the formation of the ice beneath it, should, of course, rest with a uniform and very slight pressure on the ice, and if kept with a full supply of water the counterbalancing-weights or lifting mechanism will have to be supplied with a suitable compensation mechanism; or the supply of water may be automatically regulated in such a manner that, as the reservoir ascends, its weight shall be increased by an increase in its contents to counteract the increased leverage of the weights. It will be obvious, however, that in this, as in many other respects, the details of construction may be materially varied without changing the principle or mode of operation of my improved refrigerating-machine.

Having fully explained the constructions and operations of the air-compressing and refrigerating mechanisms of my improved ice-machine, what I claim therein as new, and desire to secure by Letters Patent, is—

1. An air-condensing engine, in which the water injected into the cylinder is supplied through the piston of the engine by any suitable pumping mechanism, substantially as and for the purpose set forth.

2. In a refrigerating-machine, in combination with a chamber adapted to contain the ice formed, a rotary case, or its equivalent, between the bottom of which and the surface of the ice the refrigerant passes, and from which the water is distributed over the surface to be frozen, substantially as set forth.

3. In a refrigerating-machine, in combination with a suitable chamber on the bottom of which the ice is formed, a traveling surface, between which and the bottom of said chamber a space is formed, and from which the water and the refrigerant are both supplied, substantially as and for the purpose set forth.

4. A refrigerating-machine, in which the surface on which the ice is formed is wetted in advance of the supply of cold air which is discharged onto said surface, substantially in the manner set forth.

ELWYN C. WELD. [L. S.]

Witnesses:
 J. N. McINTIRE,
 ISIDORE FELBEL.